(12) United States Patent
Chen

(10) Patent No.: US 7,820,087 B2
(45) Date of Patent: Oct. 26, 2010

(54) FURNITURE COMPOSITE BOARD

(76) Inventor: Te-Lung Chen, No. 248, Yilin 1st St., Rende Shiang, Tainan County 717 (TW)

( * ) Notice: Subject to any disclaimer, the term of this patent is extended or adjusted under 35 U.S.C. 154(b) by 134 days.

(21) Appl. No.: 11/412,224

(22) Filed: Apr. 27, 2006

(65) Prior Publication Data

US 2007/0254144 A1    Nov. 1, 2007

(30) Foreign Application Priority Data

Mar. 1, 2006    (CN) .............................. 95 1 06934

(51) Int. Cl.
  B29C 65/00    (2006.01)
  B29C 67/00    (2006.01)
  D04H 1/00    (2006.01)
  B32B 3/00    (2006.01)

(52) U.S. Cl. ...................... 264/46.5; 264/46.6; 428/71; 428/292.1; 52/309.9; 52/406.1

(58) Field of Classification Search ............. 428/292.1, 428/71; 156/79; 264/45.3
See application file for complete search history.

(56) References Cited

U.S. PATENT DOCUMENTS

| | | | | |
|---|---|---|---|---|
| 4,657,798 A | * | 4/1987 | Guilhem | 428/71 |
| 5,274,864 A | * | 1/1994 | Morgan | 5/627 |
| 6,344,268 B1 | * | 2/2002 | Stucky et al. | 428/317.9 |

FOREIGN PATENT DOCUMENTS

| | | |
|---|---|---|
| CN | 02135460.X | 8/2002 |
| CN | 02268887.0 | 8/2002 |
| CN | 200320106050.5 | 10/2003 |

* cited by examiner

*Primary Examiner*—D. Lawrence Tarazano
*Assistant Examiner*—Camie S Thompson
(74) *Attorney, Agent, or Firm*—Hamre, Schumann, Mueller & Larson, P.C.

(57) ABSTRACT

A furniture composite board comprises different materials. The surface of a proper-shaped matrix is covered by thermosetting resin and then fibers. The fibers then are soaked in thermosetting resin. During the process of thermosetting, the fibers would be solidified and become hard and firm on the surface of the matrix. The composite board has strong strength and its weight would change according to the matrix. It is easy for the composite to form various shapes; easy to be produced and needs no complicated equipment.

14 Claims, 2 Drawing Sheets

FURNITURE COMPOSITE BOARD

FIELD OF THE INVENTION

The invention relates to the furniture used in the offices or families and, more concretely, it relates to the composite board and its production method used in furniture.

BACKGROUND OF THE INVENTION

Planking is widely used in furniture. Various plankings exist nowadays and the main factors of planking chosen are its strength and weight. Traditional wooden or matchwood planks have the following shortcomings:

1. It needs a large amount of wood and thus the forest will be seriously destroyed.
2. Its processing procedure is complicated and it is difficult to be variational shaped. The quality and function arc easily affected by moisture and temperature.

Because of the shortcomings mentioned above, traditional wooden or matchwood planks are adopted less.

More and more plastic composite boards are used in furniture such as "a new model of the composite board and its process" issued by No. 02135460.X in China patent. The composite board is composed of honeycomb-core plate, foamed plastics and embedded components. The honeycomb-core plate is composed of honeycomb-core paper, surface paper and bottom paper. The honeycomb-core paper is placed non-stuckly between the surface plate and bottom plate; and the foamed plastics cover or partially cover the outside of the honeycomb-core plate and embedded components. The honeycomb-core plate, embedded components and foamed plastics form a unit.

Again, "a kind of composite board" issued by No. 02268887.0 in China patent is composed of the surface plate, bottom plate, honeycomb-core paper and foamed plastic. The surface and bottom plates are straight-formed plastic plates by means of blow molding or heat pressing. The honeycomb-core paper is placed between the surface and bottom plates. The edge of the surface plate and its corresponding one of the bottom plate are joined fixed hermetically by ultrasound weld or gluing. The foamed plastics fill the gaps among the honeycomb-core plate, surface plate and bottom plate.

Again, "a versatile absorptive honeycomb-core composite board", issued by No. 200320016050 in China patent, includes the composite board and edging connecting fittings. The composite board includes the bottom plate, surface plate and honeycomb-core plate; the honeycomb-core plate is stuck between the surface and the bottom plates; the edging connecting fittings, used as the strengthening supported frame and as the connecting fittings for the composite board, cover the edge or partial edge of the honeycomb-core plate. The overlaps between the edging connecting fittings and the surface and bottom plates are connected by means of sticking or welding.

The plastic composites board mentioned above have the following shortcomings:

1. The strength of the board is not strong; the bottom and surface plates are independent components and they are connected by means of sticking and thus the connection is not stable. Moreover, the foamed plastics are not stuck to the bottom and surface plates, which reduces the strength of the board.
2. The weight of the board is not light efficiently. Because of the weights of the plastic plate, bottom plate and embedded components, the whole unit becomes heavy and is difficult for transportation and carrying.
3. The process of the board is more complicated and it needs specific devices of blow molding and suction molding.
4. As a result of the limit of the process, it is hard to form various shapes.

SUMMARY

The invention provides a kind of furniture composite board, and the purpose is to overcome the less strength, heavy weight, complicated process and difficulty of forming various shapes of the furniture composite boards used nowadays.

The invention of furniture composite board consists of the matrix, the thermosetting resin layer, and the fiber layer. The matrix, made of certain wood, is formed in desired shape and covered by several thermosetting resin and fiber layers. The fiber and thermosetting resin layers would be melted together as a unit in the process of thermosetting.

The fiber layer of a kind of furniture composite board mentioned above includes multi-layer fibers, alternative from one to eight, according to the desired strength. The top surface of the composite board, a kind of furniture composite board mentioned above, has two to eight fiber layers; the bottom surface of the composite has one to two fiber layers; this structure is designed for the reason which the top surface of the composite board requires higher solidness, and the bottom surface of the composite board requires lower one. However, some parts of the bottom surface of the composite board can be changed to have two to eight fiber layers depending on certain desired needs.

The furniture composite board mentioned above is covered by a decoration layer after the final layer with thermosetting resin.

DETAILED DESCRIPTION OF THE INVENTION

Compared with the existing techniques, the invention has the following advantages according to the description mentioned above:

First, the fiber and thermosetting resin layers melted solidify to form hard surface layers. In addition, the thermosetting resin layer and matrix integrated fully solidify in the process of thermosetting so the composite board has relatively high strength.

Second, the material of the matrix can be varied according the desired need. We can use foaming or other light materials for outdoor or carry-on furniture. We can choose metal or stone as the matrix for firm indoor furniture.

Third, the surface decoration panel is variable. Thus, the rock texture panel along with the metal matrix costs less but the weight and quality of products look like granite products. The products of wood texture panels along with the foaming matrix look like being made by log but are much lighter and thus easy for transportation and carrying.

Fourth, the matrix can easily form varieties of desired shapes. The shape of the composite board depends upon the shape of the matrix and thus the composite board can easily form various shapes.

Fifth, the production method is easy and needs no complicated devices. Following is the execution method.

Figure 1:
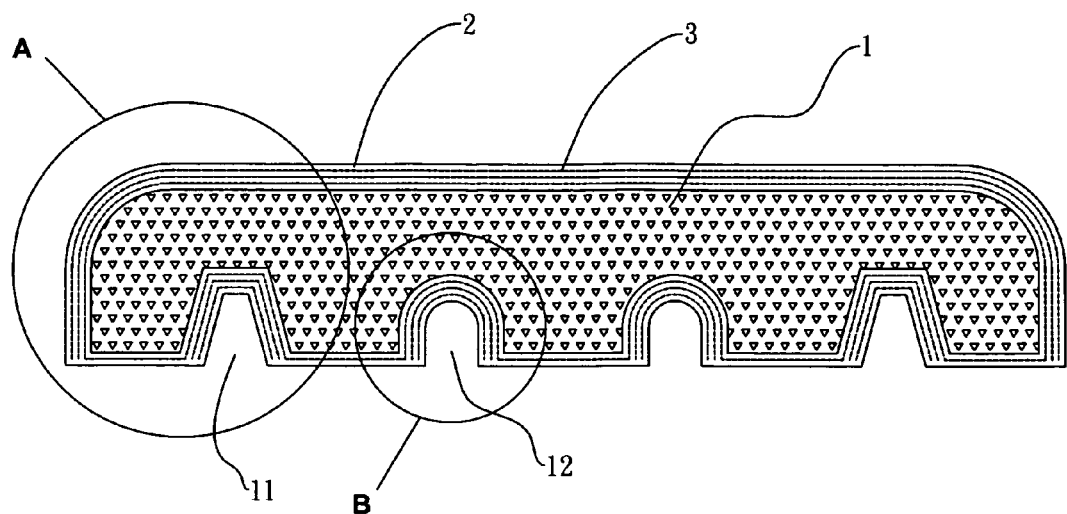
FIG. 1 illustrates a section of an embodiment of the composite proposed described in the disclosure.

The components of the composite board, referring to FIG. 1, are (1) matrix, (2) thermosetting resin layer and (3) fiber layer.

The matrix is formed by foaming materials such as EVA and Styrofoam. Once the desired shape is determined; the following operations begin. The thermosetting resin layer (2) covers the outside of the matrix (1) and the shape is formed by means of thermosetting. The fiber layer (3), composed of chemical fibers, covers the outside of the matrix. The fiber (3) and thermosetting resin layer (2) will be melted as a unit in the process of thermosetting. The fiber layer (3) can adopts either inorganic chemical fibers such as glass fibers, carbon fibers and etc., or organic synthetic fibers such as KEVLAR and NOMEX of DuPont Company.

Different fiber layers arc required in different parts of the composite board. One to eight fiber layers might be required alternatively according to the desired strength. For a tabletop board, it requires at least two fiber layers and usually at most eight ones on the top surface: and it requires merely one to two layers on the bottom surface. In some circumstances, there also will be two to eight fiber layers (3) when certain parts of a composite board demand higher strength. Each fiber layer (3) are melted together with one thermosetting layer (2) to assure the strength, and that is, the top and bottom surfaces of the fiber layer are covered by thermosetting resin.

Figure 2:
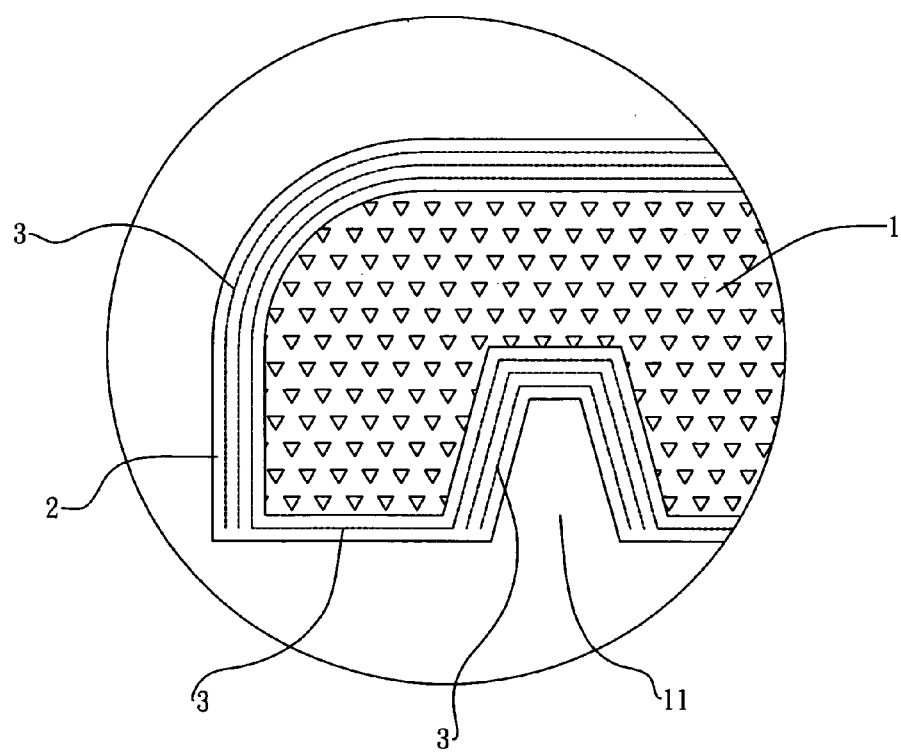
FIG. 2 is an enlarged view of the location A in FIG. 1.
Figure 3:
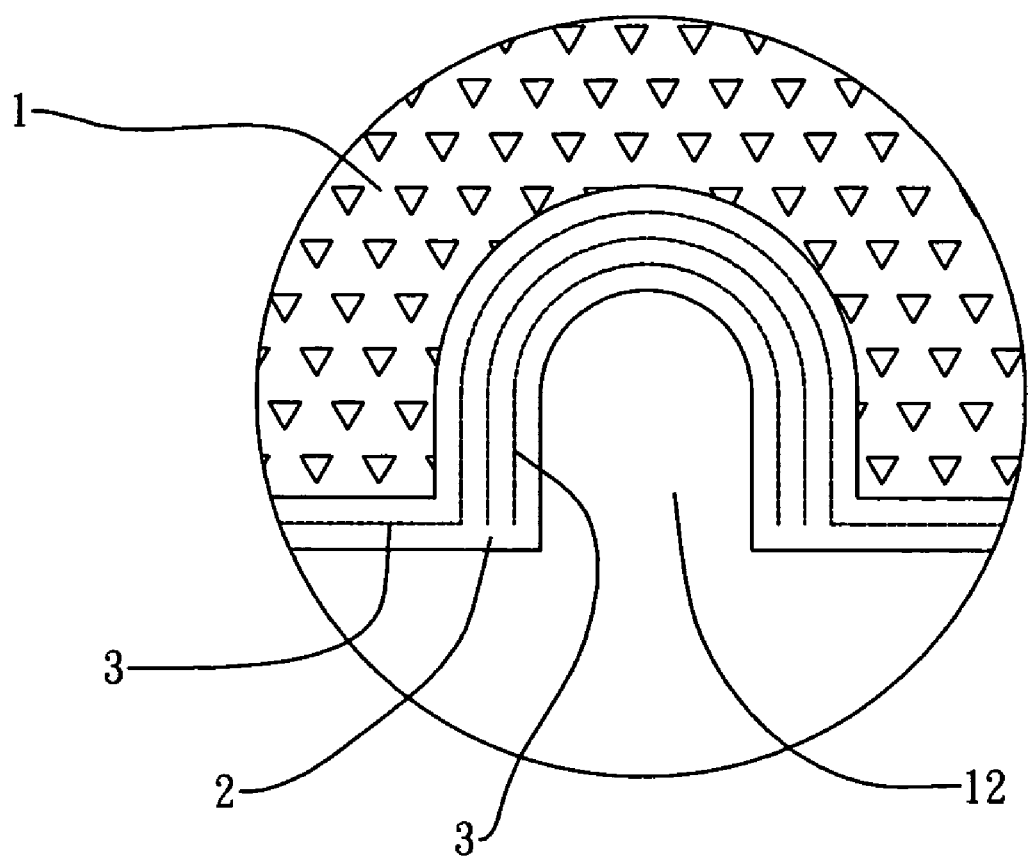
FIG. 3 is an enlarged view of the location B in FIG. 1

Referring to FIG. 1 to FIG. 3, the top surface of the composite board has three fiber layers and the bottom surface of the composite board has one fiber layer. Referring to FIG. 2, the inside surface of the V-shaped slot (11) of the table leg closing to the edge of the bottom surface of the composite board has three fiber layers (3). Referring to FIG. 3, the inside surface of the U-shaped slot (12) of the table leg on the bottom surface of the composite board has three fiber layers (3) as well. The fiber layers are used to increase the strength. Of course, more than three layers would be okay. It depends on the factors such as strength, cost and etc.

The production procedure of the composite is the following:

First, form the foaming materials to a desired shape as the matrix (1) of a composite board; the shape of the foaming materials can be formed by various methods such as casting and cutting.

Second, spread the liquid thermosetting resin on the outside surface of the matrix) and then it is covered by a fiber layer (3). Again, spread the thermosetting resin on the fiber layer (3), and then the fiber layer (3) is soaked in the thermosetting resin layer (2).

According to how many layers you desire on certain parts of the top or bottom surfaces of the composite board, repeat the steps mentioned above, that is, one fiber layer covered by one thermosetting resin layer.

Third, heat the matrix (1) covered by thermosetting resin layers (2) and fiber layers (3) to make thermosetting resin thermosetting and attach it to the outside of the matrix (1). People can either dry it by heat in big rooms or put the matrix (1) covered by thermosetting resin layers (2) and fiber layers (3) in the mold and heat the mold. The heating temperature is between 100° C. and 150° C. and the heating process lasts for one to two hours.

Fourth, polish, color and lacquer the surface of the composite board after thermosetting. You can also cover a decoration layer on the surface after the final application of thermosetting resin mentioned in step 2; then the thermosetting makes the decoration layer stick to the surface of the composite board.

The example 2 of the invention is structurally the same as example 1, but the production methods of these two examples are different. The following is the procedure of the production method of example 2:

First, form the foaming materials to a desired shape as the matrix (1) of a composite board. The shape of the foaming materials can be formed by various methods such as casting and cutting.

Second, cover the outside of the matrix (1) with the fiber fabric that was previously soaked in thermosetting resin, and more fiber fabric soaked in the thermosetting resin is required when certain parts of the top and bottom surfaces of the composite board need higher strength.

Third, heat the matrix (1) covered by the fiber fabric soaked previously in the thermosetting resin. Make the thermosetting resin thermosetting and attach it to the outside surface of the matrix (1). And then either dry it by heat in a big room or put the matrix (1) covered by the fiber fabric soaked previously in the thermosetting resin in the mold and heat the mold. The heating temperature is between 100° C. and 150° C. and the heating process lasts for one to two hours.

Fourth, polish, color and lacquer the surface of the composite board after thermosetting. You can also cover a decoration layer on the surface as mentioned in step 2. Then the thermosetting makes the decoration layer sticks to the surface of the composite board.

We adopt the fiber fabric previously soaked in the thermosetting resin in example 2. Compared with the previous production method that directly spreads thermosetting resin and fiber layer, the production method used in example 2 is simplifier. In addition, it is easy to control the content of the thermosetting resin and the content is even. The quality of the composite board in example 2 is better but it costs more.

The designing ideas of the invention are more than those two examples mentioned above. For example, the idea of the invention can easily get the metal matrix along with the decoration panel of rock texture, and create cheap products while their weight and quality look like granite products. The idea of the invention can also get the foaming matrix along with the decoration panel of wood texture, and creates products, which look like products of log, but their weight is only one third of products made of log. In addition, the connection of the table leg and the table can be achieved either through the V-shaped slot of the table leg or through the previously embedded component closely to the tabletop. Moreover, the composite board produced by this method not only applies to the tabletop but also chairs, beds or other furniture.

The invention claimed is:

1. A method for manufacturing a composite board, comprising:
providing a matrix material;
shaping the matrix material into a predetermined shape to obtain a matrix having a surrounding outside surface;
bringing a fiber material into contact with a thermosetting resin to allow the fiber material to absorb the thermosetting resin;
determining a number of layer(s) of the fiber material that is required for different portions of the composite board based on a strength required by each portion such that an entire outside surface of the shaped matrix is covered by at least one layer of the fiber material and a number of layers of the fiber material that cover an inside surface of a concave formed in the shaped matrix is greater than a number of the layer(s) of the fiber material that covers a portion of the outside surface of the shaped matrix which is in a vicinity of the concave;

covering the shaped matrix with one or more continuous layers of the fiber material that have absorbed the thermosetting resin according to the determined number of layer(s) for each portion; and drying or raising a surrounding temperature such that the shaped matrix, the one or more layers of the fiber material and the thermosetting resin melt into an integral unit by a thermosetting process, whereby at least one layer of the fiber material remains distinct from the integral unit.

2. The method for manufacturing a composite board according to claim 1, further comprising covering a most outer layer of the thermosetting resin with a decoration layer before the drying or raising the surrounding temperature; after the drying or raising the surrounding temperature, the decoration layer becoming a part of the integral unit.

3. The method for manufacturing a composite board according to claim 2, further comprising polishing, coloring and lacquering an outer surface of the integral unit.

4. The method for manufacturing a composite board according to claim 1, wherein the shaping process includes casting or cutting the matrix material.

5. The method for manufacturing a composite board according to claim 1, wherein the surrounding temperature is raised to between 100° C. and 150° C. for one to two hours.

6. The method for manufacturing a composite board according to claim 1, wherein the matrix is made of a material selected from the group consisting of wood, metal and foaming material.

7. The method for manufacturing a composite board according to claim 6, wherein the foaming material is EVA or Styrofoam.

8. The method for manufacturing a composite board according to claim 1, wherein the number of layer(s) of the fiber material is in a range from 1-8.

9. The method for manufacturing a composite board according to claim 1, wherein the fiber material is an inorganic chemical fiber or an organic chemical fiber.

10. The method for manufacturing a composite board according to claim 9, wherein the inorganic chemical fiber is a glass fiber or a carbon fiber.

11. The method for manufacturing a composite board according to claim 1, wherein the predetermined shape of the matrix includes a U-shape slot or a V-shape slot therein.

12. The method for manufacturing a composite board according to claim 1, wherein shaping the matrix material into a predetermined shape includes casting or cutting the matrix material into the predetermined shape.

13. A method for manufacturing a composite board, comprising:

providing a matrix material;

shaping the matrix material into a predetermined shape to obtain a matrix having a surrounding outside surface;

determining a number of layer(s) of fiber material that is required for different portions of the composite board based on a strength required by each portion such that an entire outside surface of the shaped matrix is covered by at least one layer of the fiber material and a number of layers of the fiber material that cover an inside surface of a concave formed in the shaped matrix is greater than a number of the layer(s) of the fiber material that covers a portion of the outside surface of the shaped matrix which is in a vicinity of the concave;

covering the shaped matrix with thermosetting resin and fiber material according to the determined number of layer(s) for each portion such that the shaped matrix is alternately covered with at least one layer of the thermosetting resin and at least one continuous layer of the fiber material, wherein the thermosetting resin is absorbed by the layer of the fiber material; and drying or raising a surrounding temperature such that the shaped matrix, the one or more layers of the fiber material and the thermosetting resin melt into an integral unit by a thermosetting process, whereby at least one layer of the fiber material remains distinct from the integral unit.

14. The method for manufacturing a composite board according to claim 13, wherein shaping the matrix material into a predetermined shape includes casting or cutting the matrix material into the predetermined shape.

* * * * *